(No Model.)
J. E. PACKARD
FLY TRAP.
No. 404,727. Patented June 4, 1889.
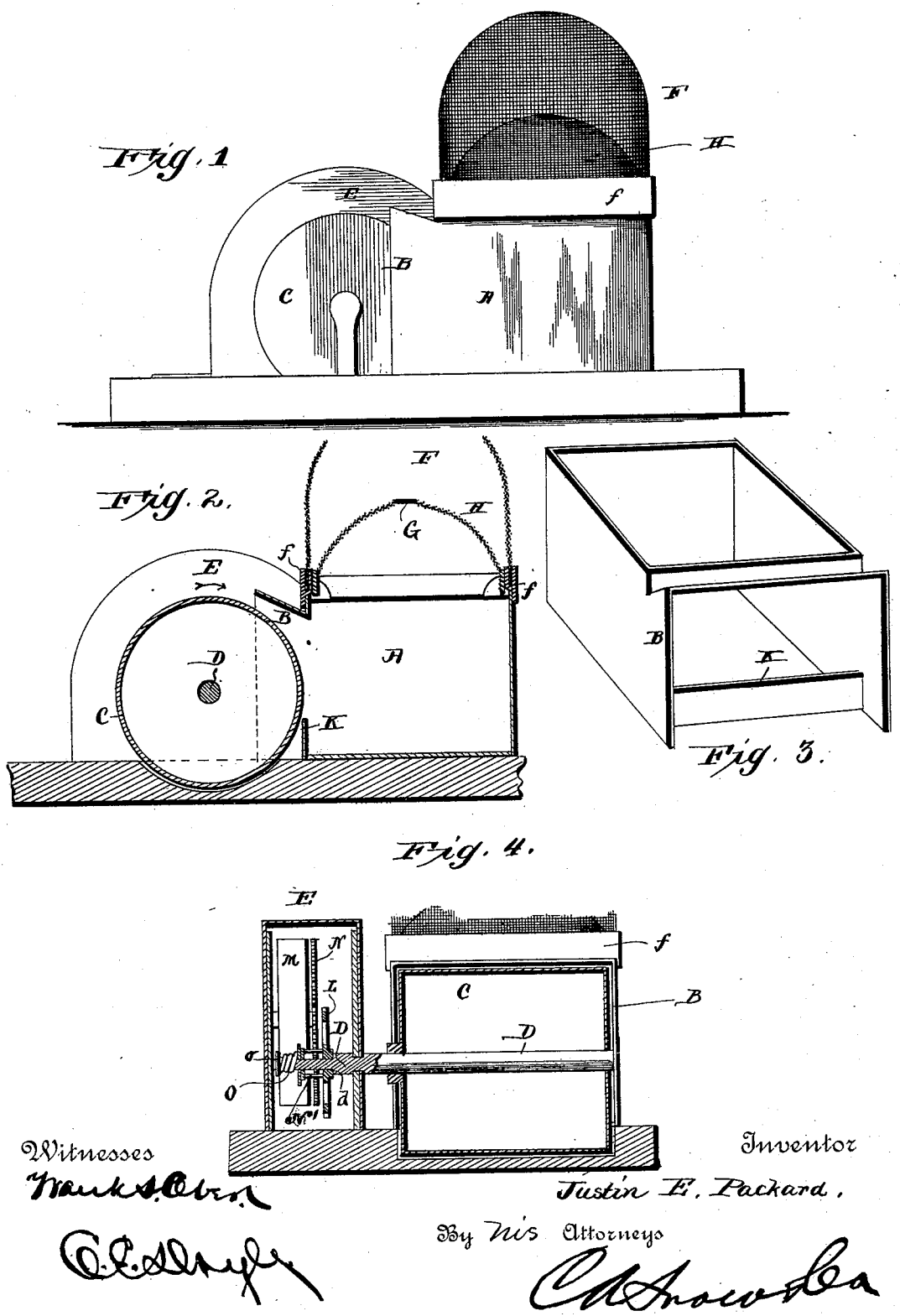
Witnesses
Inventor
Justin E. Packard,
By his Attorneys

UNITED STATES PATENT OFFICE.

JUSTIN EMERSON PACKARD, OF MENDOCINO, CALIFORNIA.

FLY-TRAP.

SPECIFICATION forming part of Letters Patent No. 404,727, dated June 4, 1889.

Application filed January 26, 1889. Serial No. 297,632. (No model.)

*To all whom it may concern:*

Be it known that I, JUSTIN EMERSON PACKARD, a citizen of the United States, residing at Mendocino, in the county of Mendocino and State of California, have invented new and useful Improvements in Fly-Traps, of which the following is a specification.

The invention relates to improvements in fly-traps; and it consists in a certain novel construction and combination of devices fully described hereinafter in connection with the accompanying drawings, and specifically pointed out in the appended claim.

In the drawings, Figure 1 is a front view of a fly-trap embodying my invention. Fig. 2 is a longitudinal central sectional view of the same. Fig. 3 is a detail view of the screen-case with the parts detached. Fig. 4 is a transverse sectional view taken through the center of the drum or cylinder.

Referring by letter to the drawings, A designates a casing of any preferred shape having one side open and provided with a flared mouth B, and C designates a revoluble drum or cylinder, one side of which is received in the open side of the casing. The drum is secured rigidly on a transverse central shaft D, one end of which projects beyond the end of the drum, and is connected with a suitable operating mechanism, as shown at E. The said operating mechanism preferably consists of a system of gear-wheels actuated by a coiled spring and governed by a regulating-fan, whereby the drum or cylinder is slowly rotated in the direction indicated by the arrow in Fig. 2, so that the periphery of the latter is continually moving toward and into the mouth of the casing. A small space is allowed between the upper side of the drum or cylinder and the upper side of the flared mouth, and the sides of the said mouth fit close to the ends of the drum or cylinder.

A dome-shaped cage F, of wire-screen or other similar material, is arranged on the casing and communicates therewith through a small aperture or entrance G, which is formed in the apex of its conical bottom H. The said bottom is removable and fits snugly in the lower side of the cage, and the cage is provided with a depending flange *f*, which fits snugly around the upper edge of the casing. The cage is removable from the casing, for a purpose to be hereinafter explained, and the bottom is removable from the cage.

K represents a stationary scraper, which is attached to the lower side of the mouth of the casing, and its free edge is arranged almost in contact with the surface of the drum or cylinder in order to remove the flies without touching the bait on the drum or cylinder.

The surface of the drum or cylinder is designed to be covered or smeared with sirup or other substance attractive to flies, and while the latter are engaged in feeding they are slowly carried by the revolution of the drum or cylinder into the casing. When the flies reach the scraper, they are swept from the surface of the drum or cylinder, and in attempting to escape pass through the aperture or entrance G into the cage F.

When it is desired to clean the cage, it is removed from the upper side of the casing, and after holding it over the fire or in steam, or immersing it in hot water, the bottom is removed.

In order that the drum or cylinder may be readily covered with the bait, I preferably connect it with the operating mechanism in such a manner that it may be independently rotated, as follows: The shaft D is provided at a suitable point beyond the end of the drum or cylinder with a shoulder *d* and the gear-wheel L, which is connected with and operated by the spring M through the gear-wheel N, and lantern-wheel N' is loosely mounted on the said shaft and bears against the shoulder. A friction-spring O is coiled on the shaft and bears at one end against the said lantern-wheel N' and at the other end against a collar *o* on the shaft. Thus the drum or cylinder and its shaft may be rotated at any time and in either direction independently of the operating mechanism; but when released the friction between the gear-wheel L and the shoulder *d* (caused by the spring O) is sufficient to enable the shaft to be rotated by the clock mechanism.

I am aware that it is old to combine in a fly-trap a rotary bait-bearing prism or polygon and a scraper or detacher to remove the flies, and I am also aware that it is old to provide fly-traps with cages to receive and confine the flies until they are disposed of.

My invention consists, first, in a cylindrical drum, which, being provided with no angles, appears while in operation to be motionless. When a prismatic or polygonal or other angular drum is used, the movement of the angles is plainly visible and is liable to frighten the flies; but the movement of a cylindrical drum is not easily seen.

My invention consists, further, in so arranging the drum that it may be rotated in either direction independently of the operating mechanism, whereby it may be readily coated with the bait.

Heretofore it has been the practice to connect the drum to the operating mechanism, so that the operator must apply the bait as the drum turns.

My invention consists, further, in the removable cage having a detachable bottom, thus enabling the flies to be destroyed and then removed without a chance of their accidental escape.

My invention consists, further, in simplifying the construction and arrangement of the scraper or detacher. I provide my improved trap with a stationary scraper, the edge of which is arranged close to the surface of the drum. A pivoted or self-adjusting scraper is not necessary in my device, as will be evident.

Having thus described the invention, I claim—

In a fly-trap, the combination, with the casing, of the detachable cage, and the revoluble drum provided with a shaft having a shoulder $d$, the gear-wheel mounted loosely on the shaft and connected to suitable clock mechanism, and the spring O, coiled on the shaft and bearing against the said gear-wheel to press it against the shoulder $d$, substantially as and for the purpose specified.

In testimony that I claim the foregoing as my own I have hereto affixed my signature in presence of two witnesses.

JUSTIN EMERSON PACKARD.

Witnesses:
T. W. L. BALLISTER,
C. W. GRAY.